Aug. 4, 1959  A. MAIER  2,897,690
MULTI-SPEED GEAR TRANSMISSION
Filed Nov. 28, 1956
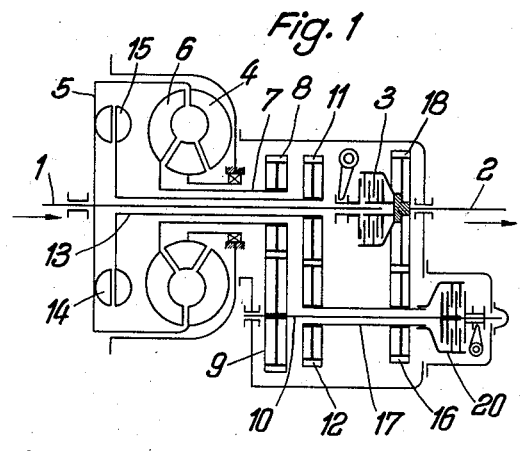
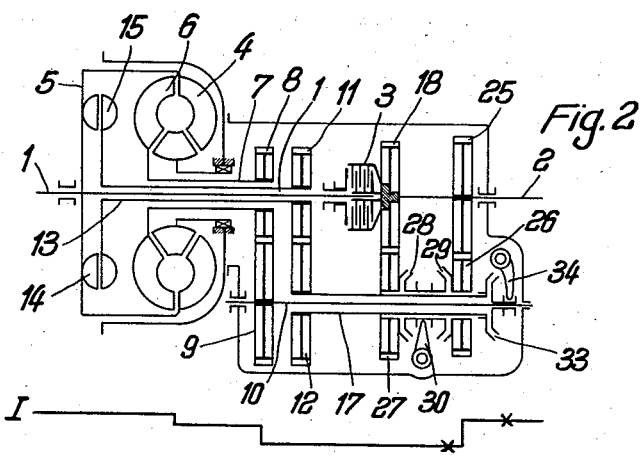
Inventor:
ALBERT MAIER,
By Parry & Heere
ATTORNEYS

United States Patent Office 2,897,690
Patented Aug. 4, 1959

2,897,690

MULTI-SPEED GEAR TRANSMISSION

Albert Maier, Friedrichshafen, Germany, assignor to Zahnradfabrik Friedrichshafen, Friedrichshafen am Bodensee, Germany Application November 28, 1956, Serial No. 624,924

Claims priority, application Germany December 1, 1955

5 Claims. (Cl. 74—720)

This invention relates to gear transmissions and more particularly to gear transmissions providing for variable speed through a combination of gears and fluid operated components.

In present variable speed gear transmissions employing a plurality of gears, there is generally provided a separate mechanical clutch for each speed of the transmission. The present invention relates to a simplification of the transmission in that the number of clutches required is minimized.

It is an object of the present invention to provide a combination of gears in relationship with a hydraulic clutch and a torque converter so as to provide a simple mode of effecting torque transfer for various speed. Other objects and features of the invention will be apparent from the description herein.

In general, the invention contemplates the combination of a torque converter and a fluid clutch together with gear pairs wherein the gears of each pair are in constant engagement. The basic principle contemplates the driving the one or the other of said gear pairs through the torque converter or through the fluid clutch. Coupling means are utilized which may be in the form of clutches and/or additional gear pairs for achieving additional speed variation to transmit torque to a driven shaft.

A detailed description of the invention will now be given in conjunction with the appended drawing in which:

Fig. 1 is a diagrammatic section of a gear transmission in accordance with the invention.

Fig. 1a is a speed-change chart for Fig. 1 showing the components which are engaged or disengaged to achieve either of two speeds or direct drive.

Fig. 2 is a diagrammatic section for a transmission having four speeds and a direct drive.

Fig. 2a is a speed-change chart for Fig. 2 showing the components engaged or disengaged for four speeds and direct drive.

Referring now to Fig. 1, the invention comprises the combination of a driven shaft 1 which drives a disk 5 to which is connected the impeller 4 of a torque converter. The disk 5 likewise drives the impeller 14 of a fluid clutch. The turbine 6 of the torque converter is carried on a sleeve 7 concentric with and rotative on driven shaft 1, which sleeve is keyed to a driven gear 8. The turbine 15 of the fluid clutch is carried on a tubular or sleeve shaft 13 which is in turn concentric and rotative on the shaft 7, and is keyed to a driving gear 11. The fluid clutch is of a type wherein clutching or declutching is affected by filling or emptying of the clutch housing.

The driving gear 8 is in constant mesh with a driven gear 9 keyed to a counter shaft 10 which is connected to one set of plates of a friction clutch 20. The driving gear 11 is in constant mesh with a driven gear 12 carried on and keyed to a tubular or sleeve shaft 17 which is in turn carried on the shaft 10 and rotative with respect thereto. The tubular shaft 17 carries a driven gear 16 keyed thereto which is in constant mesh with a gear 18 keyed to the driven shaft 2. The tubular shaft 17 is connected to the other set of plates of the friction clutch 20, and it will be apparent that, when the friction clutch 20 is engaged, coupling is had between shaft 10 and the surrounding shaft 17.

The drive shaft 1 is coupled through a friction clutch 3 to the driven shaft 2 for direct drive when clutch 3 is thrown into engagement.

By referring to Fig. 1a the components utilized in the two speeds and the direct drive of the transmission described above are indicated. Thus, for first speed it will be apparent that the torque converter is utilized as is the gear pair 8—10, the clutch 20, and the gear pair 16—18, in that order. At this time it will be understood that the chamber of the fluid clutch is empty and no transmission of torque is had between the elements 14 and 15.

For second speed it will be noted that the chamber of the fluid clutch is filled so that torque is transmitted from plate 5 therethrough to the gear pair 11 and 12, gear 12 transmitting the torque through shaft 17 to gear 16 which transmits to gear 18 and thus to the driven shaft 2.

For direct drive the clutch 3 is engaged thus directly coupling driving shaft 1 with driven shaft 2 as hereinabove stated.

From the foregoing it will be apparent that the fluid clutch is not filled at any time except for second speed, at which time the torque converter does not transmit power.

In the form of the invention shown in Fig. 2, wherein identical reference characters are utilized to identify identical parts as found on Fig. 1, there are additional elements to the extent of providing a pair of gears 26 and 27 on the sleeve 17. These gears are rotative on the sleeve and not keyed thereto. However, either of the gears may be rotatively coupled with the sleeve by means of a conventional clutch arrangement 30 which can be shifted to the left or to the right to couple gear 26 or 27 to sleeve 17. Thus, gear 27 when coupled by means of the clutch arrangement 30 to shaft 17 can drive gear 18 with which it is constantly engaged. On the other hand, gear 26 when coupled by means of the clutch arrangement 30 to the sleeve 17 can drive a gear 25 which is keyed to the shaft 2 and with which gear it is constantly engaged.

A clutch 33, operable by the lever 34, is provided for the purpose of coupling the shaft 10 and sleeve 17 together for certain speeds.

The chart on Fig. 2a illustrates the components engaged for four speeds and direct drive. Thus, for the first two speeds drive is had through the torque converter. For the third and fourth speeds drive is had through the fluid clutch. The fifth speed, namely direct drive, the clutch 3 is engaged. In the first and third speeds, as indicated by the diagram, the gear 26 transmits torque to the gear 25. In the second and fourth speeds the gear 27 transmits torque to the gear 18. The clutch 33 is engaged for the first and second speeds.

Having thus described my invention, I am aware that various changes may be made without departing from the spirit thereof and accordingly do not seek to be limited to the precise illustration herein given except as set forth in the appended claims.

I claim:

1. In a multi-speed gear transmission, a drive shaft, a torque converter having an impeller thereof keyed to said drive shaft; a fluid clutch having an impeller thereof keyed to said drive shaft, said fluid clutch being of a type controlled by filling or emptying of the clutch fluid; a plurality of gear pairs of differing ratio wherein the gears of each pair are in constant engagement, said converter having a turbine connected to drive a gear of one of said pairs, said fluid clutch having a turbine connected to drive a gear of another of said pairs; a driven shaft, and means for connecting the respective driven gear of said gear pairs to said driven shaft, including a clutch intermediate said driving and driven shafts for effecting direct drive.

2. In a multi-speed gear transmission, a drive shaft, a torque converter having a impeller thereof keyed to said drive shaft; a fluid clutch having an impeller thereof keyed to said drive shaft, said fluid clutch being of a type controlled by filling or emptying of the clutch fluid; a plurality of gear pairs of differing ratio wherein the gears of each pair are in constant engagement, said converter having a turbine connected to drive a gear of one of said pairs, said fluid clutch having a turbine connected to drive a gear of another of said pairs; a driven shaft, and means for connecting the respective driven gear of said gear pairs to said driven shaft, said connecting means comprising a countershaft, a sleeve rotative on said countershaft, one of said driven gears being carried on and keyed to said sleeve, a drive gear on said sleeve and keyed thereto, a driven gear on said driven shaft and keyed thereto, said latter gears being in constant mesh, and a clutch for coupling said countershaft to said sleeve.

3. In a multi-speed gear transmission, a drive shaft, a torque converter having the impeller thereof keyed to said drive shaft; a fluid clutch having the impeller thereof keyed to said drive shaft, said fluid clutch being of a type controlled by filling or emptying of the clutch fluid; a plurality of gear pairs of differing ratio wherein the gears of each pair are in constant engagement, the turbine of said converter being connected to drive a gear of one of said pairs, the turbine of said fluid clutch being connected to drive a gear of another of said pairs; a driven shaft, and means for connecting the driven gear of said gear pairs to said driven shaft, a clutch intermediate said driving and driven shafts for effecting direct drive, said connecting means comprising a countershaft, a sleeve rotative on said countershaft, one of said driven gears being carried on and keyed to said sleeve, a drive gear on said sleeve and keyed thereto, a driven gear on said driven shaft and keyed thereto, said latter gears being in constant mesh, and a clutch for coupling said countershaft to said sleeve.

4. In a multi-speed gear transmission, a drive shaft, a torque converter having an impeller thereof keyed to said drive shaft; a fluid clutch having an impeller thereof keyed to said drive shaft, said fluid clutch being of a type controlled by filling or emptying of the clutch fluid; a plurality of gear pairs of differing ratio wherein the gears of each pair are in constant engagement, said converter having a turbine connected to drive a gear of one of said pairs, said fluid clutch having a turbine connected to drive a gear of another of said pairs; a driven shaft, and means for connecting the respective driven gear of said gear pairs to said driven shaft, said connecting means comprising a countershaft, a sleeve rotative on said countershaft, one of said driven gears being carried on and keyed to said sleeve, a pair of gears carried on said sleeve and rotative with respect thereto, a clutch for coupling either of said gears to said sleeve for torque transmission therebetween, a clutch for effecting drive transmission between said sleeve and countershaft, one of said latter gears being in constant engagement with the gear on said driven shaft, another gear keyed to said driven shaft, the other of said latter gears being in constant engagement with said other gear.

5. In a multi-speed gear transmission, a drive shaft, a torque converter having the impeller thereof keyed to said drive shaft; a fluid clutch having the impeller thereof keyed to said drive shaft, said fluid clutch being of a type controlled by filling or emptying of the clutch fluid; two gear pairs of differing ratio wherein the gears of each pair are in constant engagement, the turbine of said converter being connected to drive a gear of one of said pairs, the turbine of said fluid clutch being connected to drive a gear of the other of said pairs, a driven shaft and means for connecting the driven gear of said gear pairs to said driven shaft, said connecting means comprising a countershaft, a sleeve rotative on said countershaft, one of said driven gears being carried on and keyed to said sleeve, gear means on said driven shaft and keyed thereto, additional gear means supported on said sleeve and being in constant mesh with respective gear means on said driven shaft, and clutch means for connecting said additional gear means to said countershaft.

References Cited in the file of this patent

UNITED STATES PATENTS

| | | |
|---|---|---|
| 2,014,944 | Martyrer | Sept. 17, 1935 |
| 2,397,634 | Voytech | Apr. 2, 1946 |
| 2,748,621 | Sinclair | June 5, 1956 |